No. 754,010. PATENTED MAR. 8, 1904.
C. L. PRITCHARD.
COMMERCIAL PAPER.
APPLICATION FILED MAY 23, 1903.
NO MODEL.

No. 754,010. Patented March 8, 1904.

UNITED STATES PATENT OFFICE.

CHARLES L. PRITCHARD, OF AURORA, ILLINOIS.

COMMERCIAL PAPER.

SPECIFICATION forming part of Letters Patent No. 754,010, dated March 8, 1904.

Application filed May 23, 1903. Serial No. 158,390. (No model.)

*To all whom it may concern:*

Be it known that I, CHARLES L. PRITCHARD, a citizen of the United States, residing at Aurora, in the county of Kane and State of Illinois, have invented certain new and useful Improvements in Commercial Paper, of which the following is a specification.

This invention relates to a novel form of commercial paper particularly designed for payment of merchandise and as a current medium in a mercantile system intended to induce patronage at particular mercantile establishments.

The system involves an agreement between a coöperative association of merchants, a central agency, the purchasing public, and a bank whereby any merchant of the association party to such agreement or contract undertakes to accept in payment of goods commercial paper of this particular character and the bank agrees to pay to the maker of the same a certain rate of interest for a period of time previously agreed upon, such interest being in the nature of a discount on the goods purchased.

In carrying out the invention a medium, which may be substantially in the form of a check, is employed bearing upon it a statement to the effect that the check is good for the purchase of merchandise of any merchant authorized to accept the same and a further statement that the check when given and accepted in payment for merchandise pays interest to the maker.

In the drawing I have illustrated a form of check designed for carrying into effect the system outlined.

The check illustrated is substantially in the form of an ordinary bank-check, as 1, and may be detachably connected by a line of perforations 3 to a stub 2, intended to have placed thereon the usual memoranda for indicating to whom the check has been issued or made payable, the amount, and the date.

At some suitable place on the face of the check, as across the end adjacent the stub, as at 4, is printed, stamped, or otherwise impressed the following: "This check is good for the purchase of merchandise of any merchant authorized to accept the same" or a notice to the same effect. The check further bears on its face at 5, "This check when given and accepted in payment for merchandise bears interest to the maker at — per cent. per annum" or a substantially equivalent statement.

In practice the checks are issued by the central agency to any one desiring to use the same, and the latter fills in the name of the payee and the amount to be paid and affixes his signature. When thus filled out, the check becomes tender in payment for merchandise of the amount specified. It is of course understood that the party drawing the check will have a deposit in the bank against which the paper is drawn sufficient to meet the same when presented for payment. When the drawee tenders the check to the bank, the latter before making payment deducts from the sum called for a certain percentage or amount based upon the rate of interest specified in the check and for a period of time, such as a year or a month, previously agreed upon and a part or the whole of which is paid to or placed to the credit of the party making the check as interest and which is in the nature of a discount on the goods purchased.

The intending purchaser is induced by reason of the interest or discount paid upon the face values of his checks to patronize the members of the coöperative association.

Having described my invention, I claim—

1. A medium for use in commercial transactions substantially in the form of a check and bearing a notice that the check is for a specified purpose in transactions with certain authorized persons and a statement that the check bears interest to the maker.

2. A medium for use in commercial transactions substantially in the form of a check, and bearing a notice authorizing the use of the check for the purchase of merchandise of certain authorized persons and also that when used for a purpose stated it bears interest to the maker.

In testimony whereof I affix my signature in presence of two witnesses.

CHARLES L. PRITCHARD.

Witnesses:
E. MOLITOR,
J. MCROBERTS.